United States Patent [19]

Taylor, Jr. et al.

[11] Patent Number: 4,940,985
[45] Date of Patent: Jul. 10, 1990

[54] RADAR STABILITY MEASUREMENT SYSTEM

[75] Inventors: John W. Taylor, Jr., Baltimore; Perry A. Sorrell, Severna Park, both of Md.

[73] Assignee: Westinghouse Electric Corp., Pittsburgh, Pa.

[21] Appl. No.: 266,194

[22] Filed: Nov. 2, 1988

[51] Int. Cl.$^5$ .............................................. G01S 7/40
[52] U.S. Cl. .................................. 342/174; 342/159
[58] Field of Search ............... 342/174, 165, 168, 169, 342/170, 171, 173, 88, 82, 159

[56] References Cited

U.S. PATENT DOCUMENTS

| | | | |
|---|---|---|---|
| 3,993,996 | 11/1976 | Milan | 342/165 |
| 4,040,055 | 8/1977 | Donahue et al. | 342/162 |
| 4,305,076 | 12/1981 | Lepere et al. | 342/165 |
| 4,484,194 | 11/1984 | Arvidsson | 342/174 |
| 4,783,660 | 11/1988 | Pierce | 342/101 |
| 4,851,853 | 7/1989 | Mahoney | 342/174 |

Primary Examiner—Thomas H. Tarcza
Assistant Examiner—John B. Sotomayor

[57] ABSTRACT

A radar stability measurement system uses a microwave delay line that may be coupled between a standby transmitter and a standby receiver to test the stability of the standby channel in a radar system having at least two channels. A pulse output by the standby receiver is sampled in portions. Several samples of each portion are taken, samples are analyzed to produce a sum of residue power ($P_{rm}$) and a sum of zero Doppler power ($P_{om}$) for the m-th portion. After all samples of all portions have been taken, a single indicator of stability is calculated as ten times the log of the ratio $$\sum_{m=1}^{M} P_{om} / \sum_{m=1}^{M} P_{rm}.$$

The measurement system can also be applied to single channel systems, although a short interruption of system operation may be necessary.

20 Claims, 3 Drawing Sheets

RADAR STABILITY MEASUREMENT SYSTEM

BACKGROUND OF THE INVENTION

1. Field of the Invention

The present invention is related to measuring the stability of a radar system and, more particularly, measurement of stability of a radar system without interrupting operation of the system and including instability caused by timing jitter in addition to other causes of instability.

2. Description of the Related Art

Instability in a radar transmitter can severely degrade the ability of Doppler filter(s) in a radar receiver to suppress clutter echoes However, instability such as small fluctuations in amplitude or phase from pulse to pulse is difficult to detect and isolate. Furthermore, although good stability is a requirement of modern radar, the measurement of stability has required special test procedures which are incompatible with normal operation of the radar.

In addition, the trend in radar is toward unmanned operation to reduce the cost of operation. Most critical performance parameters, with the exception of stability, can be measured by remote control testing without disruption of normal operation. Fault isolation tests can be conducted to determine which replaceable parts should be brought to the site by maintenance personnel, thereby reducing the cost of maintenance. However, virtually all methods of measuring stability are extremely difficult to apply from a remote location due to the calibration and visual interpretation of standard test equipment which is usually performed by an operator at the site of the radar antenna. Such visual interpretation typically includes eyeball integration of a fluctuating display, such as that provided by a spectrum analyzer Furthermore, known methods of measuring stability ignore instability caused by timing jitter which can be a significant source of instability.

For the above reasons, stability is often only measured when a radar system has been shut down because it has degraded to such an extent that clutter alarms are grossly excessive. In other words, it is difficult to schedule maintenance at a time of low usage of a radar system to improve degradation of stability, due to the difficulty in identifying the extent of degradation of stability.

SUMMARY OF THE INVENTION

An object of the present invention is to provide a method for measuring stability of a radar system during operation of the radar system.

Another object of the present invention is to provide a method for measuring stability of a radar system regardless of the availability of a suitable clutter source.

Yet another object of the present invention is to provide a method for measuring stability of a radar system which does not require manually directing an antenna at a selected clutter source.

A further object of the present invention is to provide a method for measuring stability of a radar system that is capable of reducing the effects of interference from other radar on the measurement of stability.

A yet further object of the present invention is to provide a method for measuring stability that is capable of isolating sources of instability.

Yet another object of the present invention is to provide a method of measuring stability in a radar system which can be performed from a remote location.

A further object of the present invention is to provide a method for measuring stability of a radar system that is capable of detecting random phase jitter across a radar pulse.

Yet another object of the present invention is to provide a single indicator for stability of a radar system, which can indicate instability appearing in several portions of a radar pulse, but not throughout the pulse.

The above objects are attained by a method for measuring stability of a radar system over the entire effective pulse width, said method comprising the steps of sampling a portion of a pulse; repeating the sampling for a first predetermined number of pulses; calculating clutter residue power and total power in the portion of the pulse; changing the portion of the pulse sampled and repeating the sampling and calculating for each change in portion, to produce a second predetermined number of stability indications corresponding to portions of the pulses.

The method preferably includes producing a single indicator of stability of the radar system in dependence upon a ratio of $$\sum_{m=1}^{M} P_{om} / \sum_{m=1}^{M} P_{Rm},$$

where $P_{om}$ is zero Doppler power for portion m, $P_{Rm}$ corresponds to the total clutter residue power for the portion m and M is the second predetermined number of stability indications.

The method is preferably performed using an apparatus which includes a microwave delay line, operatively connectable to a transmitter and a receiver, for delaying a portion of the pulse. The measuring apparatus may be used in a radar system having at least two transmitters and at least two receivers in which case the measuring apparatus also includes switching means for connecting one transmitter-receiver pair from among the transmitters and receivers to the antenna and connecting another transmitter-receiver pair to the microwave delay line.

The above objects and advantages, together with other objects and advantages which will be subsequently apparent, reside in the details of construction and operation as more fully hereinafter described and claimed, reference being had to the accompanying drawings forming a part hereof, wherein like reference numerals refer to like parts throughout.

DESCRIPTION OF THE PREFERRED EMBODIMENTS

Figure 1:
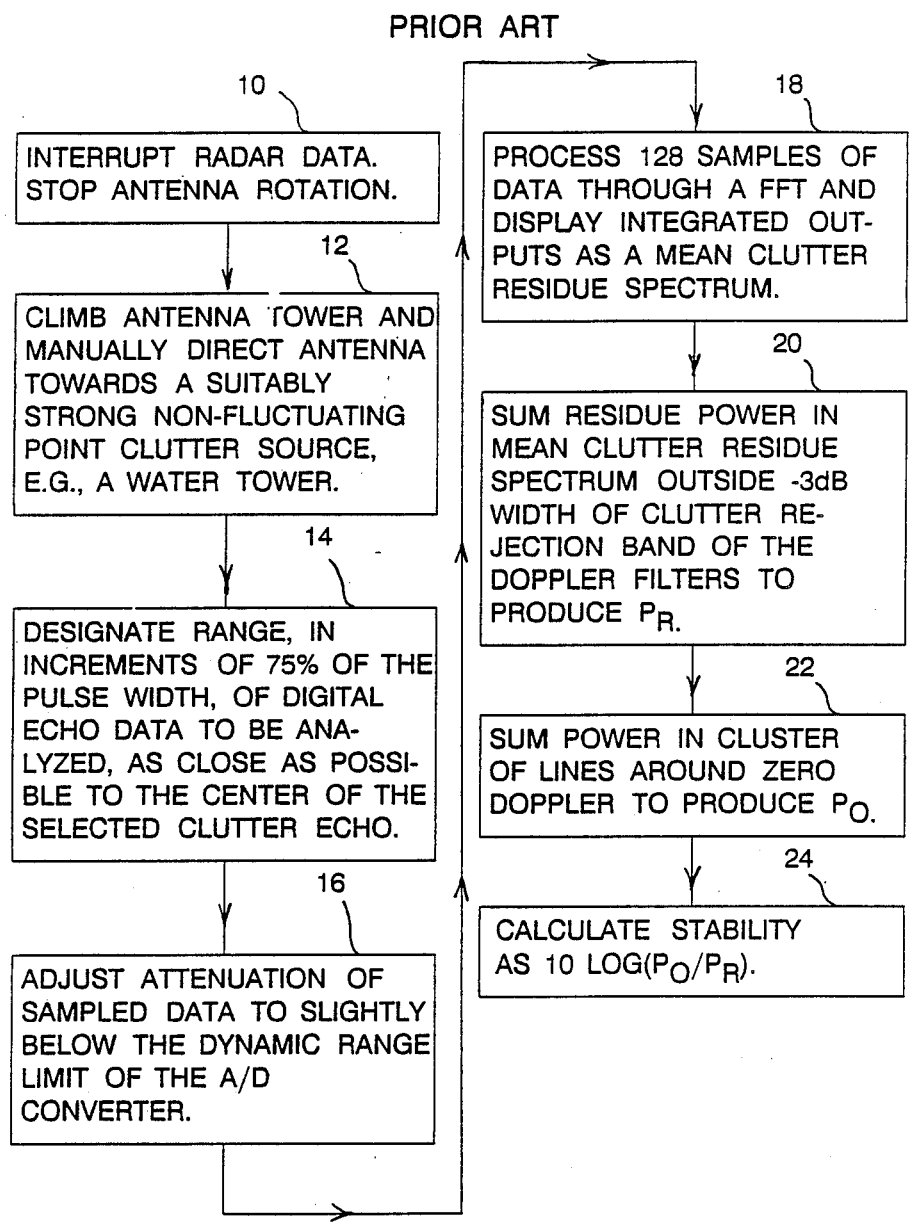
FIG. 1 is a flowchart of a prior art method for measuring stability of a radar system.

A prior art method for measuring stability in a radar system required by a recent Federal Aviation Administration specification for airport surveillance radar is illustrated by a flowchart in FIG. 1. First, operation of the radar system is interrupted 10 and rotation of the antenna is stopped. Second, it is necessary to manually direct 12 the antenna toward a suitably strong non-fluctuating point clutter source, such as a water tower. Then, after the person who directed the antenna towards the water tower has returned, the distance to the water tower is input 14 as a designated range of digital echo data to be analyzed. The precision used to input the range is, in this case, 75% of the pulse width. Next, the attenuation of the sampled data is adjusted 16 to slightly below the dynamic range limit of the analog/digital (A/D) converter in the radar system. One hundred twenty-eight (128) samples of data are processed 18 through a fast Fourier transform (FFT). The output of multiple FFTs are integrated to form a display of mean clutter residue spectrum. Using this spectrum, the residue power, outside the −3 dB width of the clutter rejection band of the Doppler filters, is summed 20 to produce a total residue power ($P_r$). Because the weighting of the FFT data to create low side lobes spreads the zero Doppler energy over several lines, the cluster of lines around zero Doppler are summed 22 to produce the input echo power $P_o$, containing the power of virtually all the lines in the FFT output. The stability in decibels is calculated 24 as $10 \log P_o/P_r$ containing the power of virtually all the lines in the FFT output.

The above-described method has several obvious disadvantages. First, it is very difficult to implement remote measurement due to the need to align the radar antenna on a clutter source and the need for visual interpretation of displays provided at the radar system site in order to edit data corrupted by external interference. Furthermore, at some sites, suitable clutter sources may not be available. In addition, like all known stability measuring methods, it is not possible to continue to operate the radar system during measurement. Also, the procedure specified by the FAA does not require any analysis of samples on leading and trailing edges of the pulse, so the full impact of timing jitter is not measured. Furthermore, many radar systems utilize a sequence of variable interpulse periods and switching from the normal operating sequence in order to employ FFTs to measure stability may eliminate one of the major contributors of instability.

The present invention overcomes all of these disadvantages. A flowchart illustrating a method according to the present invention is provided in FIG. 2. The present invention may be applied to a radar system having at least two channels, i.e., at least two transmitter-receiver pairs. A two-channel system illustrated in FIG. 3 has a channel A 30 and a channel B 31. The present invention can be used to measure stability of a radar system having a single transmitter and two receivers, one for continuing operation and the other for measuring stability. One of the advantages of the present invention is that the stability of both the transmitter and the receiver of one channel, e.g., channel A, can be measured while the other channel, e.g., channel B, remains online or active. This arrangement is illustrated by the connections in FIG. 3.

Figure 2:
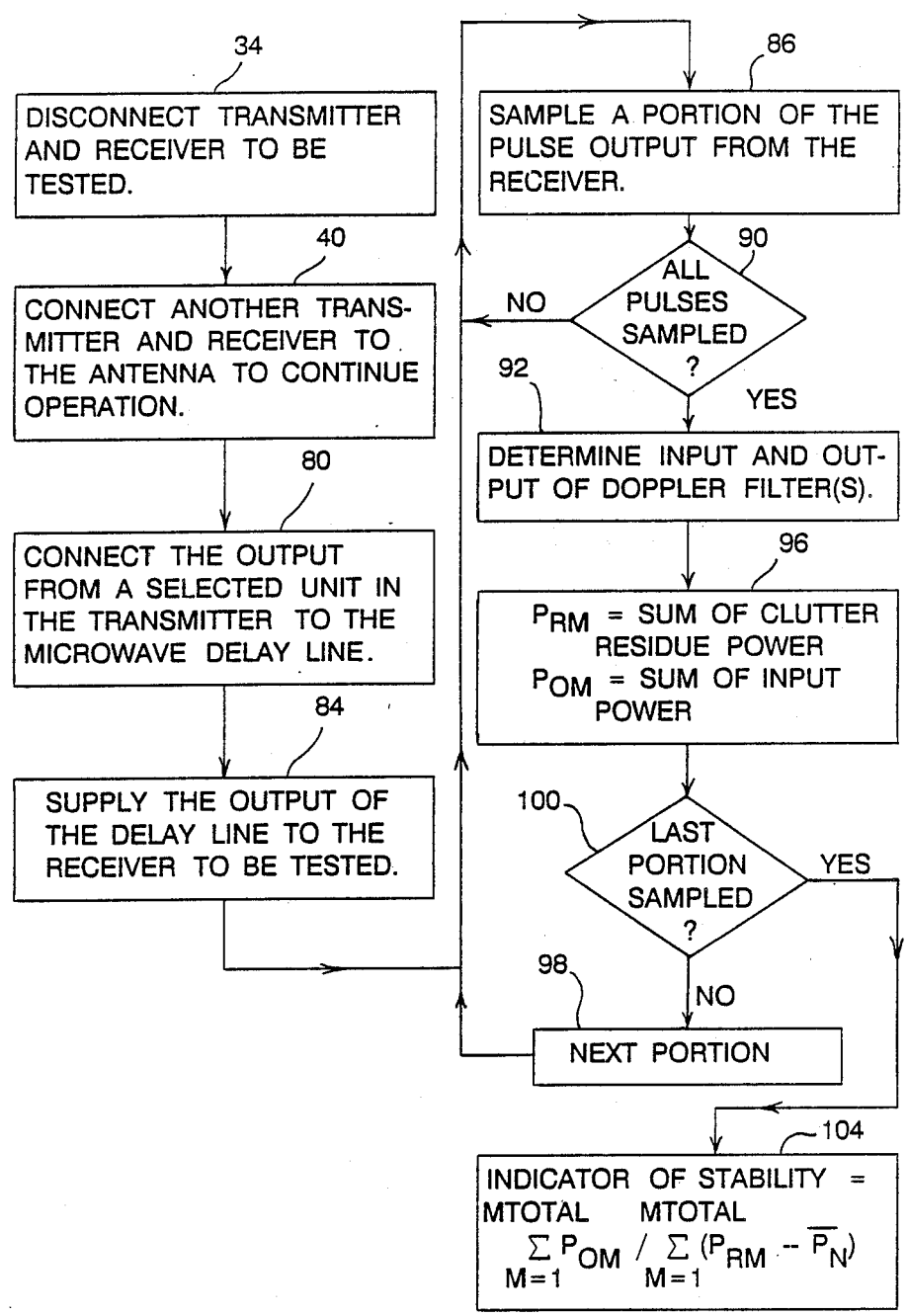
FIG. 2 is a flowchart of a method for measuring the stability of a radar system according to the present invention and FIG. 3 is a block diagram of a radar system including a measuring apparatus according to the present invention.

Assuming that channel A was the active channel and was exhibiting symptoms that might be caused by instability or that it was time for a periodic test of channel A, the first step in the method illustrated in FIG. 2 is to disconnect 34 the transmitter and receiver in channel A 30 from an antenna 35. In the system illustrated in FIG. 3, this is accomplished by changing switches 36 and 37. This simultaneously connects 40 the transmitter and receiver in channel B to the antenna 35.

Figure 3:
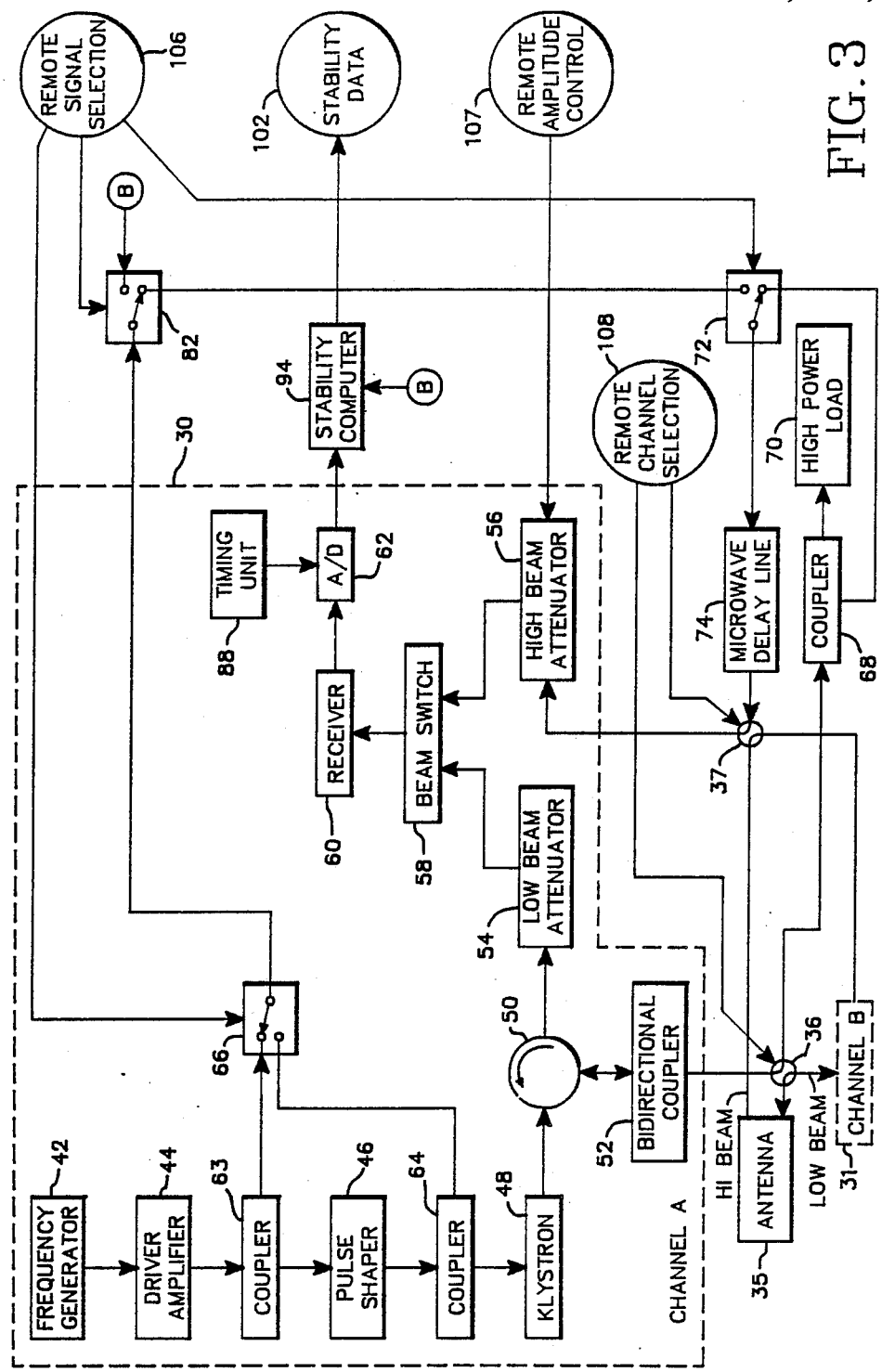

As illustrated in FIG. 3, a typical radar transmitter includes multiple stages of amplification, such as a frequency generator 42 for generating an oscillating signal, a driver amplifier 44, a pulse shaper 46 for shaping pulses of the oscillating signal and a klystron 48. The klystron 48 is connected via a circulator 50 and a bidirectional coupler 52 to switch 36. The circulator 50 also supplies the low beam output of the antenna 35 to a low beam attenuator 54 when switch 36 connects the bidirectional coupler 52 to the circulator 50. A high beam attenuator 56 is connected to switch 37. A beam switch 58 connects the low and high beam attenuators 54, 56 to a receiver 60. An analog/digital converter 62 samples the output of the receiver 60.

According to the present invention, couplers 63, 64 are connected between the driver amplifier 44, pulse shaper 46 and klystron 48. The couplers 63, 64 maintain the connection between these three elements of the transmitter but also supply the outputs to a switch 66. Another coupler 68 is connected to one of the outputs of switch 36 to supply the output of the klystron 48. Optionally, the output of the klystron 48 can be obtained from the conventional bidirectional coupler 52. The coupler 68 is connected to a high power load 70 for terminating the output of the klystron 48 and to a switch 72. A microwave delay line 74 is connected between switches 37 and 72, whereby the delayed output of the klystron 48 can be supplied to the high beam attenuator 56.

The microwave delay line eliminates external interference and enables the measurement system to detect instability caused by the stable oscillator (STALO) as well as that arising in the transmitter. Increasing the length of the delay line increases the capability of the system to detect STALO instability. If it is desired to measure only transmitter instability, the delay line is unnecessary. Also, the conventional technique of using an actual reflected echo can be used, but inconsistent samples caused by interference should not be used in determining a measure of instability.

The next step of the method illustrated in FIG. 2 is to connect 80 the output of either the driver amplifier 44, the pulse shaper 46 or the klystron 48 to the microwave delay line 74. Connection to the output of the klystron 48 is illustrated in FIG. 3. If the measured stability at this point is below a tolerable value, isolation of the source of the trouble is possible by making measurements at earlier stages of the transmitter chain. By changing switch 72, the output of the driver amplifier 44 would be supplied to the microwave delay line 74 via a channel switch 82. If switch 66 is also changed, the output of the pulse shaper 46 would be supplied to the microwave delay line 74. The output of the microwave delay line 74 is supplied 84 to the receiver 60 via the high beam attenuator 56 and beam switch 58.

The analog/digital converter 62 samples 86 an analyzable output of the receiver in response to a clock signal received from a timing unit 88. The timing unit 88 controls the analog/digital converter 62 to sample one portion of the pulse output by the receiver 60. A multiplicity of points along the pulse must be sampled. To obtain an accurate measurement, these points should be spaced significantly closer than the inverse of the 6 dB width of the transmitted spectrum, preferably less than half of this value. The number of samples is dictated by the range extent of significant clutter residue power, i.e., the effective pulse width. The term "effective pulse width" is used here to indicate that the clutter residue output of the receiver 60 may be substantially wider than the transmitted pulse width. The samples preferably go beyond both the leading and trailing edges of the pulse until clutter residue power drops below noise. If the radar transmits a phase-coded pulse and pulse compression occurs in the receiver 60 prior to sampling, all the range side lobes of the compressed pulse must be sampled as well as the main lobe.

The same portion of the pulse is sampled repeatedly, e.g., 128 times, following successive transmissions. After these 128 (or any other predetermined number) of samples have been taken 90, the power at the input and output of the Doppler filter(s) in the radar system is determined 92. Preferably, this determination utilizes the same filters, as does the radar system, or an equivalent simulation in a stability calculating computer 94. Alternatively the computer 94 may produce a Doppler spectrum similar to that produced by an FFT in a radar with fixed interpulse periods, by employing discrete Fourier transforms (DFTs).

In the latter embodiment, the stability calculating computer 94 calculates the clutter residue spectrum by multiplying each spectral line representing a frequency by a response of the Doppler filter(s) to the frequency represented by that spectral line and sums the clutter residue power to produce a value $P_{rm}$ for the m-th portion of the pulse output by the receiver 60. In addition, the power at or near zero Doppler (e.g., the sum of the cluster of Doppler frequencies closest to zero) is determined to produce a value $P_{om}$ for the m-th portion. The production of $P_{rm}$ and $P_{om}$ is illustrated as being performed in block 96 of FIG. 2 to provide a portion stability indication for portion m.

The portion sampled by the analog/digital converter 62 is changed 98 by changing the timing of the clock signal output by the timing unit 88. Spacing between the portions should not exceed one-half of the inverse of the 6 dB width of the transmitted pulse spectrum in order to ensure that clutter residue in one portion of the pulse is not missed. The number of portions of the pulse which are sampled is dictated by the range extent of the clutter residue power, i.e., by the effective pulse width. Steps 86, 90, 92 and 96 are repeated until the last portion has been sampled 100. Thus, a predetermined number of stability indications are produced.

As each value of $P_{rm}$ and $P_{om}$ are calculated, these values can be output as stability data 102 to a remote site (not shown). This allows more detailed analysis of the cause of instability to be performed at the remote site. In addition, a single indicator of stability is calculated 104 using equation (1).

$$10 \log \left( \sum_{m=1}^{M} P_{om} / \sum_{m=1}^{M} P_{Rm} \right) \quad (1)$$

The value of $P_{rm}$ may be used as the value of $P_{Rm}$. Some radar systems use a servo to maintain a fixed noise level at the analog/digital converter 62. In this case, a constant is preferably subtracted from $P_{rm}$ to produce $P_{Rm}$, thereby reducing bias error. In other radar systems, the mean noise power ($P_n$), measured in a similar manner with the transmitter off, may be subtracted from $P_{rm}$ to produce $P_{Rm}$. The indicator of stability produced by equation (1) may be calculated by the stability computer 94 or, if the individual values of $P_{rm}$ and $P_{om}$ are transmitted to the remote site, the calculation may be performed at the remote site.

As indicated by circles 106-108 the elements of the transmitter to be connected to the microwave delay line, the amount of attenuation of the high beam attenuator 56 and the channel to be tested may all be selected by signals from the remote site. Other control signals that are not shown may also pass between the radar system and the remote site.

The many features and advantages of the present invention are apparent from the detailed specification and thus, it is intended by the appended claims to cover all such features and advantages of the device which fall within the true spirit and scope of the invention. Further, since numerous modifications and changes will readily occur to those skilled in the art, it is not desired to limit the invention to the exact construction and operation illustrated and described. For example, if additional isolation of elements of the transmitter is desired, a spare driver amplifier may be provided for the frequency generator 42 so that the operation of the driver amplifier 44 may be tested. Accordingly, all suitable modifications and equivalents may be resorted to falling within the scope and spirit of the invention.

We claim:

1. A method for measuring stability of a radar system, said method comprising the steps of:
   (a) sampling a portion of a pulse to detect input and output power of a Doppler filter in the radar system;
   (b) repeating step (a) for a first predetermined number of pulses;
   (c) calculating a portion stability indication for the portion of the pulse repeatedly sampled in step (a), said calculating performed to determine clutter residue power at the output of the Doppler filter and the input power of the Doppler filter, detected for the first predetermined number of pulses; and
   (d) repeatedly changing the portion of the pulse sampled in step (a) and repeating steps (a)-(c) for each change, to produce a second number of stability indications over an effective pulse width of pulses sampled in step (a).

2. A method as recited in claim 1, wherein spacing between the portions sampled in step (a) is less than one-half of the inverse of the 6 dB bandwidth of a transmitted pulse spectrum.

3. A method as recited in claim 1, wherein step (c) comprises the steps of:
   (c1) producing a Doppler spectrum using a Fourier transform;
   (c2) computing the clutter residue spectrum by multiplying each spectral line representing a frequency by a response of the Doppler filter to the frequency;
   (c3) summing the power at approximately zero Doppler and the clutter residue power of the samples after step (c2) to produce the input power and a sum of clutter residue power, respectively, as the portion stability indication for the portion of the pulses sampled during each iteration of step (b).

4. A method as recited in claim 3, wherein step (c2) comprises using a measurement system Doppler filter having characteristics identical to the Doppler filter in the radar system to determine the response of the Doppler filter to the frequency represented by each spectral line.

5. A method as recited in claim 3, wherein step (c2) comprises simulating the Doppler filter in the radar system to produce the response of the Doppler filter to the frequency represented by each spectral line.

6. A method as recited in claim 3, wherein step (c1) comprises producing a Doppler spectrum using one of a discrete Fourier transform or, if the radar employs constant interpulse periods, a fast Fourier transform.

7. A method as recited in claim 1, further comprising the step of (e) producing a single indicator of stability of the radar system in dependence upon a ratio of $$\sum_{m=1}^{M} P_{om} / \sum_{m=1}^{M} P_{Rm},$$

where $P_{om}$ is the sum of zero Doppler power for portion m from step (c), $P_{Rm}$ corresponds to the sum of clutter residue power for the portion m from step (c) and M is the second predetermined number of stability indications over the effective pulse width.

8. A method as recited in claim 7,
wherein $P_{Rm} = P_{rm} - \overline{P}_n$, where $P_{rm}$ is the sum of clutter residue power for the portion m from step (c) and $\overline{P}_n$ corresponds to mean noise power measured when no signal is present, and
wherein the single indicator of stability is $$10 \log \left( \sum_{m=1}^{M} P_{om} / \sum_{m=1}^{M} P_{Rm} \right).$$

9. A method as recited in claim 1, wherein said radar system comprises a first transmitter, a first receiver and an antenna, and
wherein step (a) comprises the steps of:
(a1) supplying the pulse output by the first transmitter to a microwave delay line;
(a2) supplying the pulse as output from the microwave delay line to the first receiver to produce an analyzable output; and
(a3) sampling the analyzable output of the first receiver.

10. A method as recited in claim 9, wherein said radar system further comprises a second transmitter and a second receiver, and
wherein said method further comprises the following steps performed prior to step (a):
(e) establishing disconnection of the first transmitter and first receiver from the antenna; and
(f) establishing connection of the second transmitter and the second receiver to the antenna to maintain operation of the radar system during steps (a)-(d).

11. A method as recited in claim 9, wherein the first transmitter comprises multiple stages of amplification, each stage producing an output signal, and
wherein step (a1) comprises the step of selecting the output signal from one of the stages as the pulse to be supplied to the microwave delay line.

12. A method as recited in claim 1, wherein step (d) produces stability indications at least from the leading edge through the trailing edge of the clutter residue.

13. A measuring apparatus for measuring stability of a radar system, said measuring apparatus comprising:
sampling means for sampling a portion of a pulse to detect input and output power of a Doppler filter in the radar system;
calculation means for calculating the clutter residue power in the output power of the Doppler filter and the input power of the Doppler filter for the portion of for the first predetermined number of the pulses sampled by said sampling means to produce a portion stability indication; and
portion selection means for repeatedly changing the portion of the pulse sampled by said sampling means to produce a second number of stability indications over an effective pulse width of pulses sampled by said sampling means.

14. A measuring apparatus as recited in claim 13, wherein said radar system comprises a first transmitter operatively connectable to said measuring apparatus, a first receiver and an antenna operatively connectable to said first transmitter and said first receiver, and
wherein said measuring apparatus further comprises
microwave delay means, operatively connectable to the first transmitter, for delaying the pulses output by the first transmitter; and
a second receiver, operatively connected to said microwave delay line for receiving delayed pulses from said microwave delay line.

15. A measuring apparatus as recited in claim 14, wherein said radar system further comprises a second transmitter operatively connectable to the antenna, and
wherein said measuring apparatus further comprises switching means for connecting one transmitter-receiver pair from among the first and second transmitters and first and second receivers to the antenna and connecting another transmitter-receiver pair to said microwave delay means.

16. A measuring apparatus as recited in claim 15, further comprising remote test means for supplying control signals to said switching means to control operation of said switching means and for receiving the second number of stability indications.

17. A measuring apparatus as recited in claim 13, wherein the first transmitter comprises multiple stages of amplification, each stage producing an output signal, and
wherein said measuring apparatus further comprises selection means for selecting the output signal from one of the stages to be supplied to said microwave delay means.

18. A measuring apparatus as recited in claim 17, further comprising remote test means for supplying control signals to said selection means to control operation of said selection means and for receiving the second number of stability indications.

19. A measuring apparatus as recited in claim 13, further comprising computation means for computing a single indicator of stability of the radar system in dependence upon a ratio of $$\sum_{m=1}^{M} P_{om} / \sum_{m=1}^{M} P_{Rm},$$

where $P_{om}$ is a sum of the zero Doppler power for a portion m, $P_{Rm}$ corresponds to a sum of the clutter residue power for the portion m and M is the second predetermined number of stability indications.

20. A measuring apparatus as recited in claim 13,
wherein said sampling means comprises an analog/digital converter operatively connected to the first receiver and to said calculation means, and
wherein said portion selection means comprises a timing unit, operatively connected to said analog/digital converter, for generating a clock signal having a timing, with respect to the pulse sampled by said analog/digital converter, that varies to change the portion of the pulse sampled.

* * * * *